United States Patent [19]
Shapiro

[11] 3,961,909
[45] June 8, 1976

[54] UNIFORMLY POROUS BODY

[75] Inventor: Zalman M. Shapiro, Pittsburgh, Pa.

[73] Assignee: Atlantic Richfield Company, Los Angeles, Calif.

[22] Filed: Jan. 17, 1975

[21] Appl. No.: 541,755

Related U.S. Application Data

[60] Continuation of Ser. No. 289,196, Sept. 14, 1972, abandoned, which is a division of Ser. No. 751,680, July 29, 1968, Pat. No. 3,762,026, which is a continuation of Ser. No. 250,112, Jan. 8, 1963, abandoned.

[52] U.S. Cl. ............................ 29/192 CP; 29/182.1; 29/191.2
[51] Int. Cl.² ........................ B22F 1/02; B22F 3/10
[58] Field of Search ................ 29/182, 182.1, 191, 29/191.2, 192, 419, 420, 420.5, 423, 424, 527, 527.1, 527.2; 75/200; 117/65, 107.2, 118; 239/127.1

[56] References Cited
UNITED STATES PATENTS

| | | | |
|---|---|---|---|
| 2,077,873 | 4/1937 | Broselton | 29/192 R X |
| 3,049,799 | 8/1962 | Breining et al. | 29/420 |
| 3,137,995 | 6/1964 | Othmer et al. | 239/127.1 X |

OTHER PUBLICATIONS

McGeary, R. K., "Mechanical Packing of Spherical Particles," pp. 513-522, *Journal of the American Ceramic Society*, vol. 44, No. 10, 1961.

*Primary Examiner*—Ronald J. Shore
*Attorney, Agent, or Firm*—John R. Ewbank

[57] ABSTRACT

A method of making a high temperature and stress resistant body of desired porosity in whose practice a green porous body (FIGS. 4, 5, 9, 10) of higher than the desired porosity is formed by compacting different size fractions of spherical particles (A, 23, 27 FIGS. 4, 5) or by winding fine cold-drawn wire (53 FIG. 9) or mesh of fine cold-drawn wire (73 FIG. 10) on a mandrel (51 FIG. 7; 71 FIG. 10). The green body is cemented into a rigid body and at the same time its porosity is decreased to the desired magnitude by depositing cementing material (H5 FIG. 11, 61 FIG. 9, 77 FIG. 10) in the pores (25 FIGS. 5 and 6; 55 FIG. 9) from a gas. Typically a body of tungsten is formed by reducing a tungsten halide in the pores with hydrogen.

4 Claims, 11 Drawing Figures

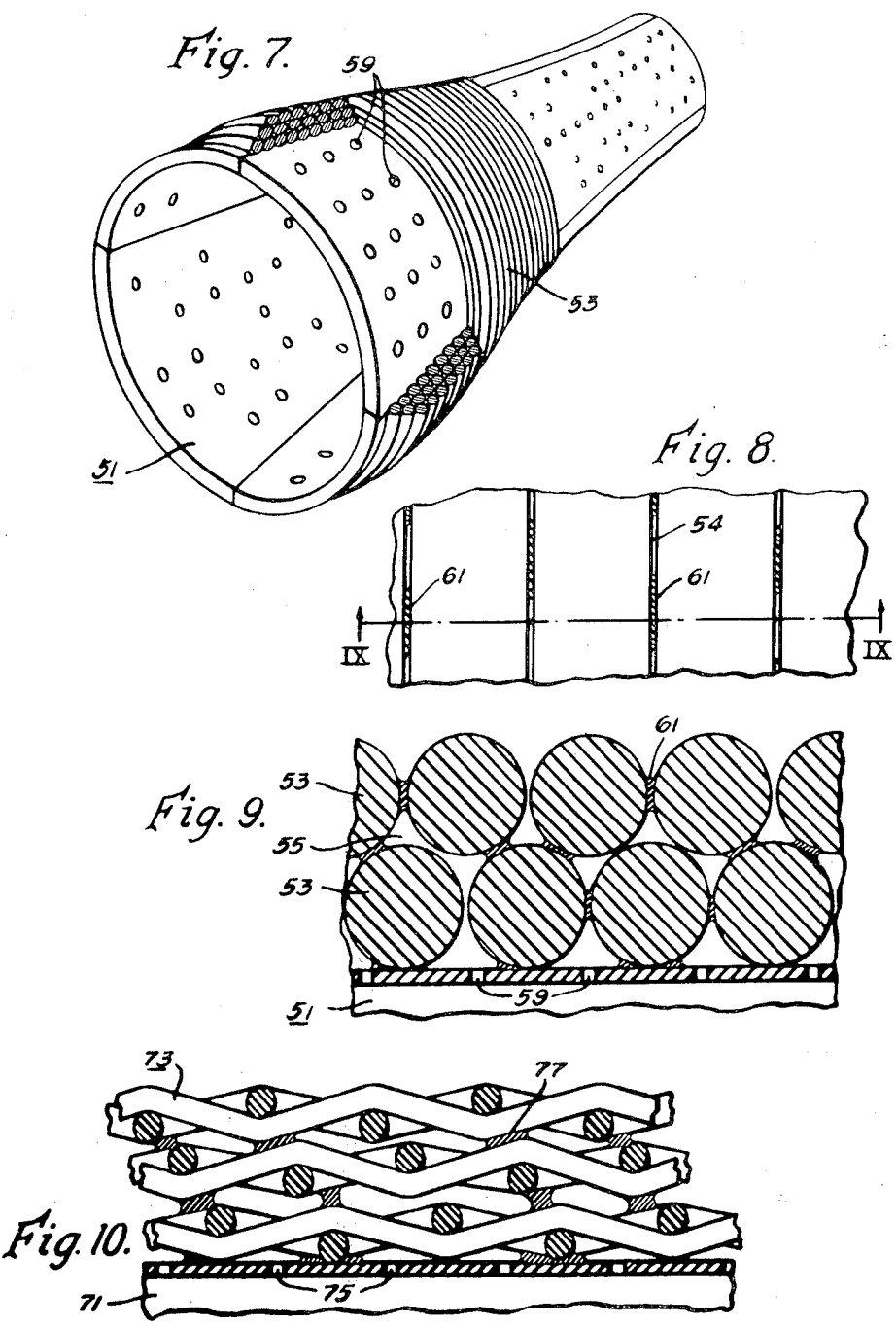

UNIFORMLY POROUS BODY

REFERENCE TO RELATED APPLICATIONS

This is a continuation of Ser. No. 289,196 filed Sept. 14, 1972 (being abandoned concurrently with this filing) which was a division of Ser. No. 751,680 filed July 29, 1968 (now U.S. Pat. No. 3,762,026 of Oct. 2, 1973), which is a continuation of Ser. No. 250,112 filed Jan. 8, 1963 (now abandoned), and is related to Ser. No. 745,230 (now U.S. Pat. No. 3,609,842), each of said related applications being deemed here reiterated.

This invention relates to the art of fabricating or forming bodies of materials which do not readily lend themselves to the usual forming operations such as machining, molding, casting, forging, spinning, rolling and the like. In one of its specific, but highly important aspects, this invention is applicable to bodies of tungsten. But in its broader aspects this invention applies to such materials as tantalum, niobium, zirconium, titanium, vanadium, silicon, rhenium, chromium and molybdenum. These materials may be characterized as highly refractory, high strength materials; that is, each of these materials has a high melting temperature and is capable of manifesting high strength.

Specifically, this invention deals with producing bodies of predeterminable shape or form which have a predeterminable porosity. This invention also relates to the art of producing high-temperature and high-stress resistant materials and of bodies of such materials having predeterminable shape and porosity. This invention has particular relationship to the production of such materials and bodies which are capable of withstanding the environmental and operating conditions to which critical components of the nuclear and aerospace apparatus are subjected. Typical of such components are the nozzles of space rockets.

The temperature and pressure of the gases blasting through the nozzle of a space rocket operating with acceptable efficiency may exceed 6,000°F. and 900 pounds per square inch of area. The abruptness with which the mechanical and thermal stresses imposed on the material of the nozzle change enhances the severity of these conditions. On ignition, the temperature of the nozzle rises sharply and non-uniformity giving rise to high thermal and mechanical stresses which may cause the nozzle to spall and crack. In addition, the high temperature and reactive nature of the propellant gases as well as the possible presence of particulate matter tend to alter the original nozzle shape and size through the loss of material by melting, corrosion and erosion. Any of these deleterious effects may deteriorate the nozzle enough to prevent the rocket from accomplishing its mission and it is indispensable that the nozzle be fabricated of such material and in such manner as to minimize these changes.

It is an object of this invention to provide a method of producing a high temperature resistant body having a selectable form and porosity. It is another object of this invention to provide a method of producing a material for a rocket nozzle or the like which shall be capable of meeting the above described rigorous conditions; it also is an object of this invention to provide a body such as a rocket nozzle of such a material In providing rocket nozzles and like bodies, the practice has been adopted of forming the body of a high-melting point substance. Such substances as tantalum carbide (melting point 7015°F.) and hafnium carbide (melting point 7025°F.) have high melting points but do not in their present form have the necessary physical attributes to lend themselves to the fabrication of such bodies. Tungsten (melting point 6170°F.) which has a lower melting point appears to have most of the necessary properties. But it is necessary that provisions be made for forming the tungsten into the desired shape. In addition, with the advent and use of more advance propellants, even tungsten must be impregnated with evaporative coolant materials such as silver or copper to prevent the surface from melting at the higher gas temperatures generated. For this purpose the body must be porous so that it can absorb the cooling metals during fabrication and release the cooling metals during the high temperature application. It is moreover essential that the pores be in communication and that the body have a mean porosity for the communicating pores which shall be reliably predictable and shall be constant, as required by the conditions of application. The higher gas pressures generated by these propellants also require stronger, tougher bodies to withstand the thermal shock and the resulting mechanical stresses. Conversely at the same gas pressures, stronger materials would permit reduction in weight.

In the practice of this art, porosity may be measured as a direct function of the purpose which it is to serve by measuring the quantity of a liquid which a porous body can absorb. In carrying out this measurement, mercury (or other dense liquids as carbon tetrachloride or acetylene tetrabromide) is injected in the pores under pressure and the quantity of mercury injected under preset conditions is determined. This procedure measures the mean "open" porosity which is of essential interest. The mean total porosity may be measured by determining the density of the body. The density may be expressed in terms of percent of the density of the solid substance (tungsten for example).

It is another object of this invention to provide a tough, strong body having a constant mean porosity which shall be capable of withstanding the thermal shock and stresses to which a rocket nozzle is subjected.

In accordance with the teachings of the prior art, refractory structure such as nozzles are made from tungsten powder by the isostatic pressing at high pressures (approximately 40 tons per square inch) and sintering at high temperatures (2000°–2200°C.) The process is excessively costly and requires complicated equipment. In addition, the powder used is produced by chemically reducing a compound such as ammonium paratungstate. The resulting structure has relatively poor mechanical properties and must be massive.

The powder which is compressed usually is irregularly shaped and of a size distribution suited to achieve sintered densities between 75 and 85 theoretical from the green billets. Because of the nature of the powder and the fabrication process, the pores obtained are irregular in shape and random in distribution and size. A good percentage of the pores are totally closed and not interconnected with other pores and are not available as regards filling with cooling metals. Not only does the quantity of silver or copper which can be absorbed in such bodies vary somewhat from nozzle to nozzle, but the effusion and evaporation of the silver or copper during operation is dependent upon the nature of the pores from area to area and the protection afforded the nozzle varies in the same manner. Other shortcomings of this prior art practice are:

1. Die design and fabrication are costly, and heavy expensive presses and heating equipment are involved.
2. The practice is adaptable to fabrication only of relatively simple shapes, thus often forcing compromising of superior performance design to minimize fabrication difficulties.
3. Even though the starting powder may have been prepared carefully as to particle shape and particle size distribution, the pressed object invariably shows considerable variation from region to region in density and extent and nature of porosity (i.e., open versus closed porosity). Further, laminations and cracks are invariably present.
4. The high temperature sintering cycle is conductive to grain and crystal growth, thus leading to lowering of the mechanical strength below the poor strength which is at best available.

It is an object of this invention in its specific aspects to overcome the above described difficulties. Another object of this invention is to provide a low-cost method or a process for making a porous body of selectable shape and porosity and also to provide such a method for making a high temperature and high-stress resistant porous body such as a rocket nozzle, the pores of which shall communicate and the porosity of which shall be constant or reproducible within narrow limits. A further object of this invention is to provide such porous bodies.

A specific object of this invention is to provide a process or method for making tungsten and other refractory metal skeletal structures of reliably controllable density and porosity, which structures shall be capable of being infiltrated and/or consolidated with other metals such as silver, copper, silicon, hafnium, vanadium, chromium, niobium, zirconium, tantalum, tungsten, molybdenum rhenium and others as well as alloys of these and others or with refractory materials including ceramics, such as hafnium carbide, zirconium carbide, tantalum carbide, alumina and other carbides, borides, silicides and nitrides.

This invention in one of its aspects arises from the realization that the closer complete uniformity in pore size and characteristic is approached, the more uniform, predictable and reliable is the performance of the infiltrated nozzle. It was also realized that ideal uniformity might be closely approached by replacement of the reduced powder by spherical particles of specific size fractions, the quantity of each fraction and the particle dimensions being selected so as to provide the final required porosity. But such spherical powder is relatively inactive due to the low specific surface (surface area per unit mass) and previous preparation history and cannot readily be sintered. In accordance with this invention in one of its aspects a method is provided for cementing the spherical particles together without significant alteration in the geometry and uniformity of the pores and without weakening the green shape.

In accordance with this invention in one of its specific aspects one or more carefully selected size fractions of spherical tungsten particles are prepared by plasma jet fusion or other methods such as fluidized-bed decomposition or reduction of the halides and packed into appropriate shapes by mechanical packing and/or compaction in the manner described in R. K. McGeary's paper "Mechanical Packing of Spherical Particles," Journal of American's Ceramic Society 44 10 513–522 (1961). This paper is included herein by reference. For packings consisting of more than one fraction, the particles of each successive fraction would have a diameter of approximately one-tenth to one-fifth of the diameter of the preceding fraction. These particles dimensions may range between +400 U.S. standard mesh and −60 U.S. standards mesh; that is, the particles are of such dimensions as to pass through a 60 mesh sieve and be retained by a 400 mesh sieve.

The mass compacted as disclosed above is then consolidated or cemented together by reacting a tungsten halide such as pure tungsten hexafluoride or tungsten hexachloride with pure hydrogen obtained for example by diffusion through a silver-palladium membrane in the pores of the mass. Tungsten hexaiodide may also be used. This compound requires less or no hydrogen to effect the deposit. The reduction may also be effected by other reducing gases such as cracked ammonia. The mass may be precleaned to remove oxide or other contaminants prior to the cementing. This reaction produces uniform deposition of tungsten on the surface of the particles throughout the interstices of the porous body. As the tungsten deposits, it bridges the particles and connects them together. To assure uniformity of penetration and deposit, fine-grain structure, the reaction is best carried out slowly at relatively low temperatures up to approximately 900°F. Deposition at temperatures of about 480° to 900°F. does not significantly alter the ductile-to-brittle transition temperature or the mechanical properties of the green mass. Because of the manner in which the spherical particles arrange themselves in a nested fashion during the compacting, the pores are in communication. The ultimate porosity is determined in the initial porosity and the amount of material deposited.

For example, assume that a final porosity ranging between 17 and 25 percent is desired. An initial packing density of approximately 60 percent would then allow for the deposition of adequate tungsten from the vapor phase to yield a strong body containing the desired pore volume. Such an initial packing density is readily achievable with spheres of a single size by the technique described in the McGeary paper cited above. Should it be desirable to reduce the amount of tungsten deposited from the vapor phase, higher initial green densities can be achieved by the utilization of a binary system consisting of spherical particles of two sizes. As cited above, use of ternary or quaternary systems of spherical particles can be used to obtain a range of initial green packed densities up to approximately 93 percent.

Another aspect of this invention arises from the realization that the tensile strength of substance such as tungsten increases and the ductile-brittle transition temperature decreases with the density of the substance and the fineness of its grain. Very dense, fine grained tungsten or other like material may be obtained by cold working (cold drawing or rolling) the material. Thus, the ultimate tensile strength of cold-drawn tungsten wire of 1 mil diameter wire at room temperature may exceed 600,000 pounds per square inch while that of sintered 80 percent dense tungsten may just exceed 50,000 pounds per square inch. In accordance with this aspect of the invention use is made of the high strength of tungsten wire for fabrication of complex shapes, particularly where additional reliability and weight reduction is very important, as for example, in the making of rocket nozzles. Conceivably the mass so formed may be cemented or bonded by plasmajet flame spraying with tungsten. But more satisfactory bonding is achieved by reducing tungsten compounds in situ and thus depositing tungsten in the pores of the mass and this mode of bonding constitutes one of the important contributions of this invention.

In accordance with this specific aspect of the invention fine cold-drawn tungsten wire is wound on a mandrel with many lateral holes to allow the easy passage of gas through the holes. The mandrel has the internal shape of the desired object. Depending on the tension of the wire, a body is thus wound which typically may be 60–65 percent dense with respect to theoretical density. A tungsten halide, typically tungsten hexafluoride or tungsten hexachloride is then passed through the holes in the mandrel and through pores formed by the turns of the wire and reduced there by pure hydrogen. The deposited tungsten bridges the strands of wire and cements them together. The deposition takes place at a controlled temperature which may range from 480° to about 900°F., far below the recrystallization temperature of the wire and does not alter the mechanical properties of the wire. The wire in this case typically may be of a diameter of between 0.0001 inches and 0.020 inches. The diameter is determined by the porosity and mechanical properties desired. Successive layers after the first may be wound over the regions where successive turns of the lower layers are in contact. The winding is such that the pores of the structure are in communication. The wire can also be cross wound to achieve desired porosity, geometry, and mechanical properties.

The structure produced by winding wire on a mandrel as just described is stronger in a direction perpendicular to the axis of the turns than in a direction parallel to the axis of the turns. In accordance with a further aspect of this invention high strength in all directions of the structure (e.g., in the direction of the axis of the nozzle as well as in the direction perpendicular to the axis) is achieved by winding on a mandrel fine cold-drawn tungsten wire mesh or cloth of a variety of weaves, properly tailored to give the desired density or porosity and shape. This forms a green body of uniform pore size and distribution which is then cemented by the vapor phase reduction of the tungsten hexafluoride or chloride with high purity hydrogen. As in the other embodiments, the deposition is accomplished slowly at temperatures ranging from 480°F. to approximately 900°F. to minimize alteration in the favorable mechanical properties of the structure.

This invention in its specific aspects contemplates tungsten structures and tungsten is peculiarly suitable for the practice of this invention. In its broader aspects, this invention is not limited to tungsten, but includes structures of powder, wire or mesh of niobium, tantalum, zirconium, titanium, silicon, vanadium, hafnium, rhenium, chromium, and molybdenum. Further, the bonding or cementing agent may also include all of the aforementioned materials, and is not limited to tungsten or the base metal used to make the green shape.

Within its broader aspects, this invention also includes deposition of refractory and ceramic materials within the interstices of cemented-bonded shapes prepared from particles, wires, and mesh to form cement-like composite materials. Several such materials can be simultaneously co-deposited or several materials can be deposited in succession. Successive deposition is particularly suitable where it is desirable to deposit a barrier material to prevent interaction with the green mass or a layer on the green mass. In certain situations the green mass may be heated so that the outer layer fuses and cements the mass on cooling.

Metals may also be deposited to cement green masses of ceramic or glass particles, filaments or fibers including carbonaceous filaments or fibers. Deposition of these metals is accomplished by vapor phase reduction or decomposition or liquid phase infiltration followed where required by chemical reaction. As indicated previously, the materials which can be inserted into the porosities of the consolidated/cemented shapes include in addition to the metals the carbides of zirconium, tantalum, thorium, hafnium, niobium and the oxides of uranium, thorium, aluminum, magnesium, and zirconium as well as nitrides, silicides and borides. These materials have attractive properties in that they combine the high strengths of the metal matrix with the additional refractory properties of the ceramic. Such materials have special use and attractiveness in high temperature applications where both high strength and good thermal shock properties are required.

The novel features considered characteristic of this invention are disclosed generally above. For a more thorough understanding of this invention both as to its organization and as to its operation, together with additional objects and advantages thereof, reference is made to the following description taken in connection with the accompanying drawings, in which:

FIG. 7 is a view in asymmetric illustrating apparatus for practicing the aspect of this invention involving the winding of wire into a mass;

FIG. 8 is a fragmental view in side elevation of a portion of a body produced with the apparatus shown in FIG. 8;

FIG. 9 is a view in section taken along line IX—IX of FIG. 8;

FIG. 10 is a fragmental view in section enlarged showing apparatus for practicing the aspect of this invention involving the formation of a body from wire mesh.

Figure 1:
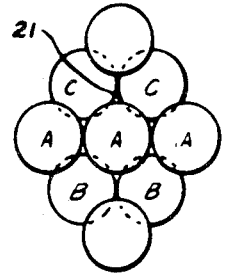
FIG. 1 is a generally diagrammatic fragmental view in side elevation, highly enlarged, of a mass of spherical particles as they are packed in the practice of the aspect of this invention involving the compacting of particles.
Figure 2:
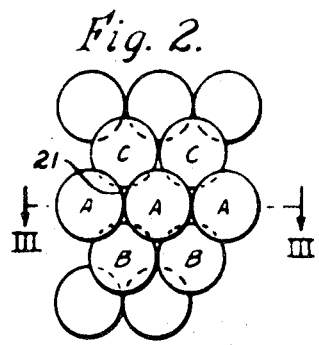
FIG. 2 is a view taken in the direction of line II—II of FIG. 1.

The article shown in FIGS. 1 through 6 is a portion of a porous body made up by mechanical packing or compacting a number of sizes of generally spherical particles. The largest particles as shown in FIGS. 1 and 2 are disposed in layers, the particles in the center layers being labelled A, the particles in the layer below A, B, and the particles in the layer above A, C. The particles A, B, C, should be compacted under such pressure that adjacent spheres are generally tangent. The pressure should not be so high that the spheres are deformed into a mass of appreciable solidity. Pressures of the order of 1.0 to 50 pounds per square inch are satisfactory.

With the particles A, B, C compacted so that they are tangent, there are regions 21 between the particles which are bounded by the adjacent spherical surfaces. These regions are in communication. Within these regions 21 smaller particles 23 may be nested. Typically the particles 23 of next smaller size than the particles A, B and C should have a diameter of one-fifth to one-tenth the diameter of the particles A. There are spaces 25 defined by surfaces of the larger particles A, B, C and of the smaller particles 23. Within these spaces still smaller particles 27 having diameters of about one-fifth to one-tenth of the particles 23 are deposited.

Figure 3:
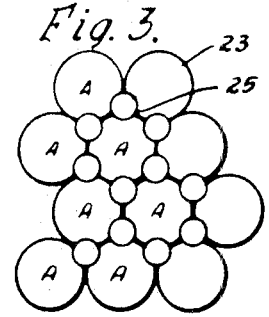
FIG. 3 is a view in section taken along line III—III of FIG. 2.
Figure 4:
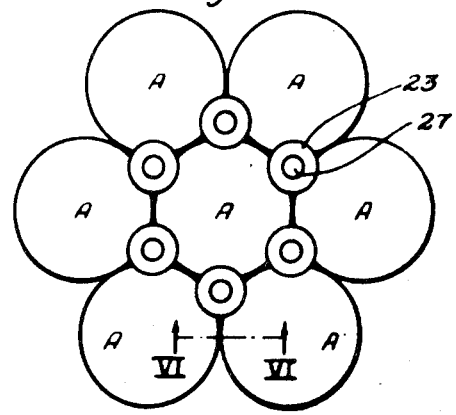
FIG. 4 is a view in top elevation showing one layer of the largest particles of FIG. 1 and the smaller particles nested in the spaces between progressively larger particles.
Figure 5:
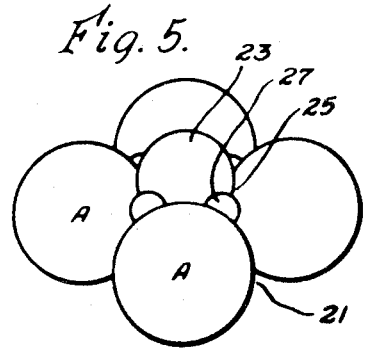
FIG. 5 is a view in isometric of the layer shown in FIG. 4.

In making the mass the spherical particles can be formed by feeding powder into a plasma jet torch and collecting the particles emitted by the plasma. The spherical particles are then assembled one fraction at a time while vibrated mechanically and tumbled thoroughly so that the distribution of the particles is relatively uniform. The loading may be effected by depositing the particles in the form under a piston on which a relatively small weight, of about 20 or 30 pounds, is placed. The second and next smaller size fraction is then added and caused to nest into the appropriate voids as shown in FIG. 3 by mechanical vibration with a load applied in the same way as to the largest fraction. The particles of the second size are deposited in the voids of the particles of the first size so that the volume of the mass remains unchanged. The position of the piston under the weight is also unchanged. This process is repeated for each successive smaller sized particles. The particles are thus compacted into a porous mass. The spaces between the particles are in communication.

The green compacted mass has a predetermined porosity. To reduce the porosity to the desired magnitude or to cement the particles, tungsten deposits 31 are produced in the pores by reducing a tungsten halide with pure hydrogen at controlled temperature in the range of 480°F. to about 900°F. The spherical particles A, B, C, 23, and 27 are bridged by the deposit.

A body having a desired form and a desired porosity is readily fabricated in this way. The physical properties of this body can be set by proper selection of the green material and the cement and their relative properties and is determined primarily by the particle geometry.

Figure 11:
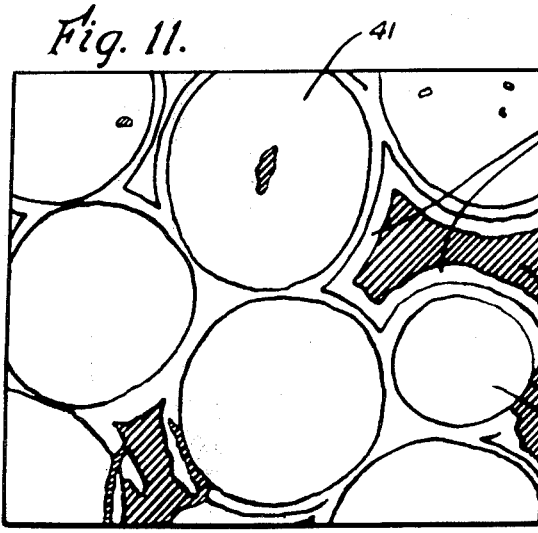
FIG. 11 is a reproduction of a photomicrograph of about 100X magnification showing a portion of a body produced in the practice of this invention.
Figure 6:
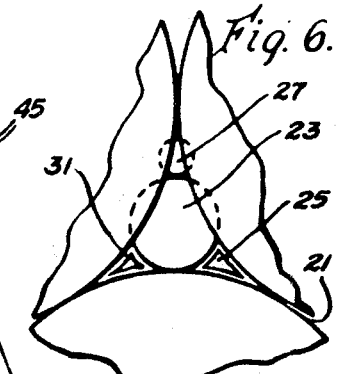
FIG. 6 is a view in section further enlarged taken along line VI—VI of FIG. 4.

In FIG. 11 a photomicrograph of a body of tungsten in accordance with this invention is shown. This body includes particles 41 and 43 of two sizes. As can be seen from FIG. 11, the deposited tungsten 45 cements the particles together.

The apparatus shown in FIGS. 7, 8, 9 includes a mandrel 51 on which a fine, cold drawn, tungsten wire 53 is wound. The mandrel 51 is rotatable by a suitable drive (not shown) to effect the winding of the wire. Between the turns of wire 51 there are spaces 54. Because of these spaces the green wound structure is porous and the pores 55 are in communication. The mandrel 51 is hollow and has holes 59 in its surface. A tungsten halide and pure hydrogen are conducted through the pores and produces tungsten deposits 61 in the pores. The deposit 61 is discontinuous as can be seen from FIG. 8.

In accordance with a further specific aspect of this invention, the wire 53 may be wound on the mandrel 51 under tension and may be maintained in tension while the tungsten is deposited from the halide. After the deposit is completed, the tension may be relaxed. A body formed in this way is prestressed and its strength is increased.

The embodiment of the invention shown in FIG. 10 includes a perforated mandrel 71 on which a mesh 73 of fine, cold-drawn, tungsten wire is deposited. A tungsten halide and pure hydrogen are conducted through the holes 75 in the mandrel. The mass is maintained at a temperature which can range from 480° to 900°F. Reduced tungsten deposits 77 are produced in the body wound on the mandrel. The deposits start at the junctions of the wires and spread out from these junctions. The quantity deposited depends on the density of the gas flow and the duration of the reducing process. Usually the deposited material is so small a proportion of the body volume as not to affect the strength. The desirable tensile properties of the wire is not affected by heating to 900°F. during the time required for cementation. The mesh may be pretensioned in different directions during the winding and the cementing to produce a prestressed structure.

In accordance with a further aspect of this invention a green body consisting of some one or more flat layers of mesh or filaments or wires, prestressed, may be cemented by deposition as disclosed to produce a plate.

While as a rule uniform deposition from the halide is desirable, situations may arise where the cementing substance should be concentrated in one part or another of the green mass to achieve variable porosity or other properties. Variable deposition is achieved by localizing the flow of the halide, varying its concentration or varying the temperature of the green mass.

While preferred embodiments have been disclosed herein, many modifications thereof are feasible. This invention then is not to be restricted except insofar as is necessitated by the spirit of the prior art.

I claim:

1. A body of substantially uniform communicating porosity throughout, said body consisting only of the combination of spheres of a plurality of sets of preselected size and refractory material deposited in the interior of the porous body for bonding together all said spheres, the largest spheres being generally tangent with adjacent largest spheres in order to define void spaces therebetween, the diameter of each set of small spheres being selected within the range from one-tenth to one-fifth of the diameter of the next larger set of spheres, each smaller set of spheres being nested substantially uniformly in the void spaces defined amongst the spheres of larger size and defining smaller void spaces thereby, the refractory material being deposited in the interior of the porous body to partially fill some of the void spaces to bond all of said spheres together and establish a porosity of selected amount without significant alteration in the geometry and uniformity of the pores.

2. The body of claim 1 in which the refractory material, each of the spheres, and the entire body is a single metal selected from the group consisting of tungsten, rhenium, niobium, tantalum, silicon, zirconium, titanium, vanadium, hafnium, chromium, and molybdenum and the porosity is selected to be within a range from about 17 percent to about 25 percent, and the refractory metal bonding all of said spheres together is deposited from the gas phase.

3. A material comprising a group of generally spherical refractory particles, said group having a first fraction of said spheres being generally tangent with adjacent spheres in said fraction in order to form void spaces therebetween, and only a second fraction of said spheres distributed throughout said first fraction and tangent with at least some of said first fraction spheres, said second fraction spheres being nested within at least some of said first fraction void spaces and establishing smaller void spaces thereby, said second fraction spheres having diameters of approximately one-tenth to one-fifth of said first fraction spheres diameter, and a refractory material deposit partially filling said first fraction void spaces and said smaller void spaces to cement said spherical particles together and establish communicating pores within said partially filled spaces, said communicating pores formed by said refractory material deposit comprise a porosity ranging between 17 and 25 percent.

4. A material according to claim 3 wherein said communicating pores formed by said refractory material deposit further comprise an evaporative coolant filling therewithin.

* * * * *